United States Patent [19]
Frank

[11] 4,294,004
[45] Oct. 13, 1981

[54] METHOD OF ASSEMBLING A SWITCH AND TERMINAL ASSEMBLY

[75] Inventor: James P. Frank, Rock Falls, Ill.

[73] Assignee: General Electric Company, Fort Wayne, Ind.

[21] Appl. No.: 884,097

[22] Filed: Mar. 6, 1978

Related U.S. Application Data

[62] Division of Ser. No. 671,965, Mar. 30, 1976, Pat. No. 4,095,073.

[51] Int. Cl.³ .................. H01H 11/00; H01H 11/04; H01H 9/12
[52] U.S. Cl. .................. 29/622; 339/14 R; 200/293; 200/303; 174/51
[58] Field of Search .................. 29/413, 414, 592 R, 29/592, 527.4, 622; 264/1, 92; 156/245; 350/103, 105, 106; 250/551; 200/1, 80 R, 283, 284, 293, 302, 303; 339/14 R, 147 P, 220 R, 263 R; 310/68 R, 239; 174/51, 57

[56] References Cited

U.S. PATENT DOCUMENTS

| | | | |
|---|---|---|---|
| 2,513,147 | 6/1950 | Chorpening | 339/147 P |
| 2,603,732 | 7/1952 | Hinman | 200/164 R |
| 2,792,561 | 5/1957 | Cohen | 339/157 C |
| 2,825,778 | 3/1958 | Kelleigh | 200/303 |
| 3,073,923 | 1/1963 | Anderson et al. | 200/67 B |
| 3,098,905 | 7/1963 | Anderson | 200/67 B |
| 3,124,408 | 3/1964 | Oestereicher | 339/220 R |
| 3,221,094 | 11/1965 | Cherry | 339/220 R |
| 3,287,517 | 11/1966 | Campbell | 339/14 R |
| 3,313,905 | 4/1967 | Zagorski | 200/303 |
| 3,496,394 | 2/1970 | Blacke et al. | 310/68 R |
| 4,054,767 | 10/1977 | Anderson et al. | 200/293 |

Primary Examiner—Daniel C. Crane
Attorney, Agent, or Firm—Joseph E. Papin

[57] ABSTRACT

A method of assembling a switch and terminal assembly. In this method, a plurality of terminals are disposed with electrical connection sections thereof exposed beyond a casing of the assembly and aligned generally in row formation. A ground connection section of a grounding device is disposed in the row formation with the electrical connection sections and a mounting section of the grounding device is associated in displacement preventing engagement with the casing.

A prime mover is also disclosed.

31 Claims, 11 Drawing Figures

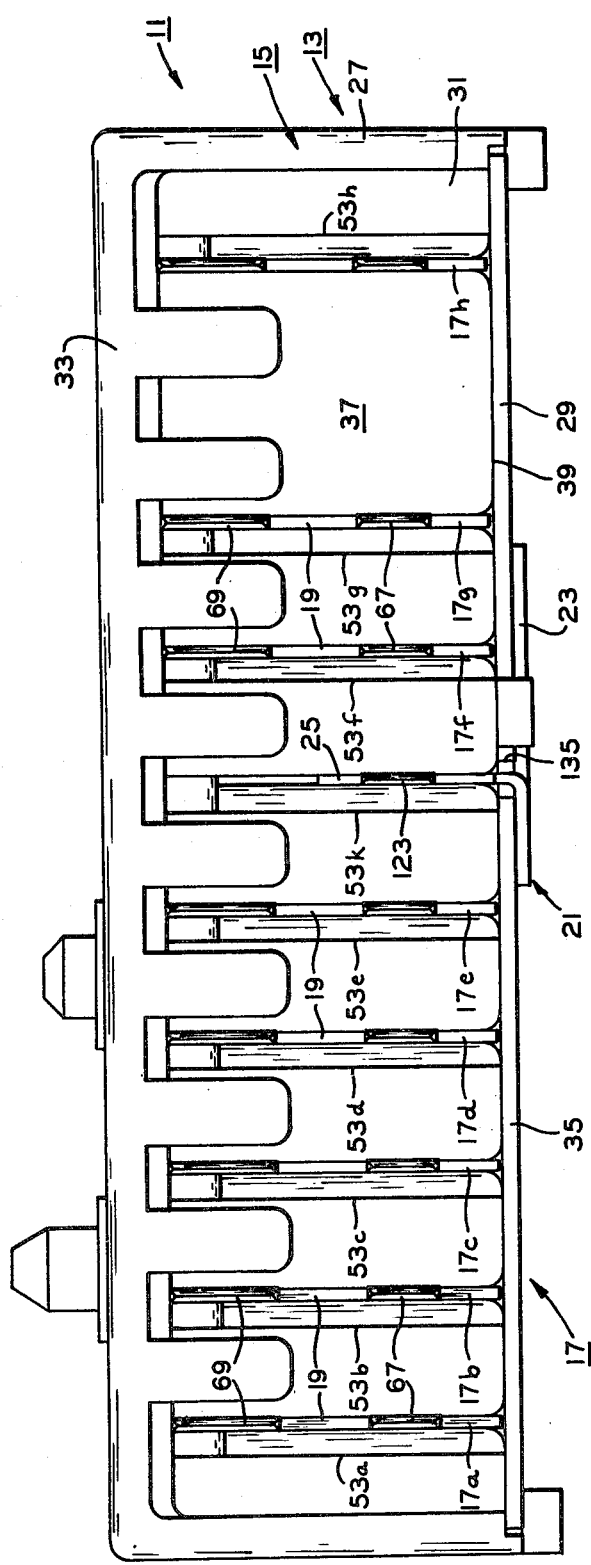
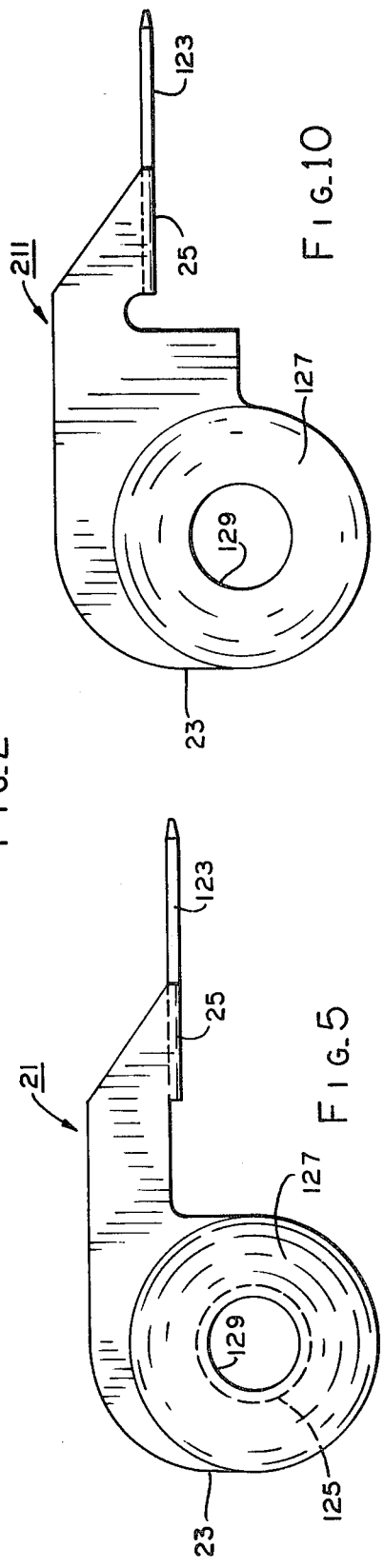

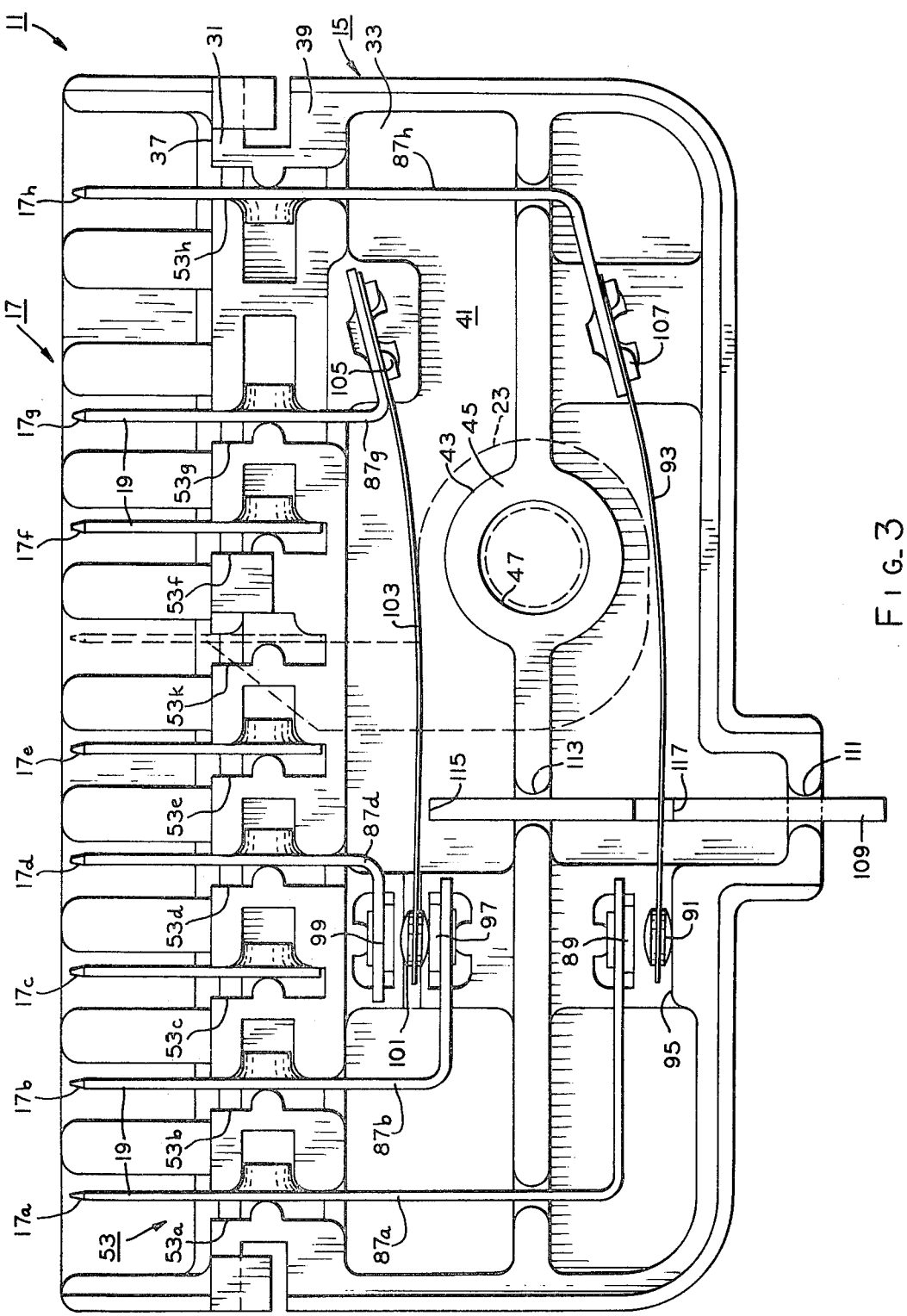

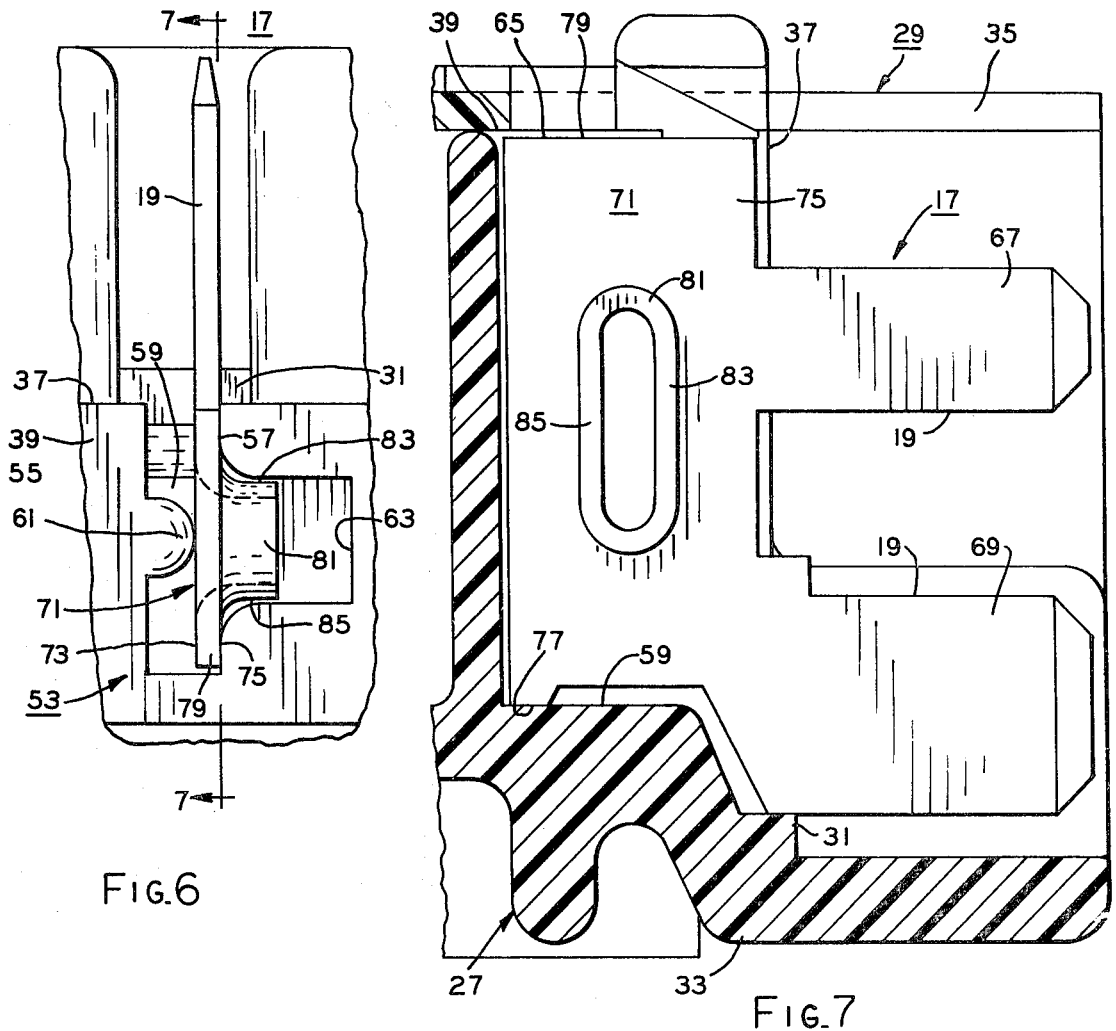
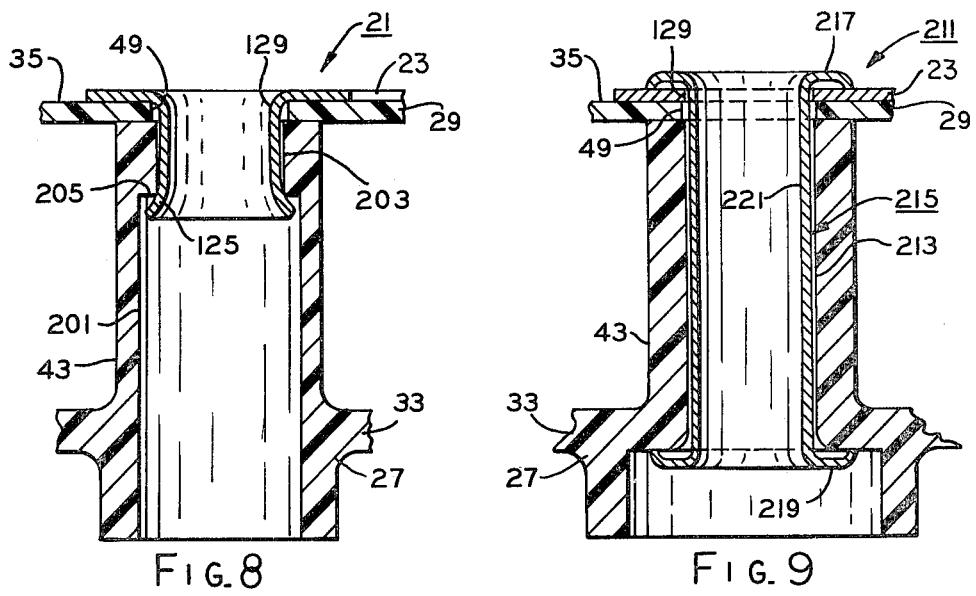

METHOD OF ASSEMBLING A SWITCH AND TERMINAL ASSEMBLY

CROSS-REFERENCE TO RELATED APPLICATION

This application is a division of application Ser. No. 671,965 filed Mar. 30, 1976, now U.S. Pat. No. 4,095,073, June 13, 1978.

BACKGROUND OF THE INVENTION

This invention relates generally to prime movers, such as dynamoelectric machines, and in particular to a switch and terminal assembly adapted to be mounted to such a prime mover and a method of assembling a switch and terminal assembly.

In the past, various types of switch and terminal assemblies have been mounted to a dynamoelectric machine externally thereof, and such switch and terminal assemblies were operable generally to at least selectively control the winding circuitry of the dynamoelectric machine. In some instances, other auxiliary circuits were connected through these past switch and terminal assemblies and selectively controlled thereby. One such past switch and terminal assembly is disclosed in U.S. Pat. No. 3,313,905 issued to W. A. Zagorski and in U.S. Pat. No. 3,381,197 issued to J. L. Waters et al. Other types of such past switch and terminal assemblies for controlling the winding circuitry of a dynamoelectric machine were mounted internally thereof on terminal boards or the like, as shown in U.S. Pat. No. 2,305,093 issued to J. Leflar et al. Still another type of such past electrical switches were generally totally enclosed and mounted interiorly of the dynamoelectric machine as illustrated in U.S. Pat. No. 2,603,732 issued to M. B. Hinman.

It is desirable, if not necessary in some dynamoelectric machine or electric motor applications, to effect grounding of the dynamoelectric machine, and various and sundry grounding arrangements have been utilized in the past. For instance, a lead-in metallic conduit has been connected in ground circuit relation with a dynamoelectric machine or, in some instances, a conduit or terminal box therefore; however, at least one of the more apparent disadvantageous or undesirable features of this particular grounding arrangement is believed to involve the economics of providing such conduit boxes and metallic lead-in conduits. In another of such past grounding arrangements, a ground wire was run through a lead-in metallic conduit for connection with a component of the dynamoelectric machine, and it is believed that at least one of the disadvantageous or undesirable features of this particular grounding arrangement is generally the same as that discussed above. In some of the resiliently mounted electric motors, another past grounding arrangement included a grounding strap connected between a housing part of the motor and a base therefor with such grounding strap extending across a resilient mount or ring seating such housing part on such base. At least one of the disadvantageous features of this particular past grounding arrangement is believed to be the difficulty in mounting such a grounding strap at least on a production line basis. Of course, there may be many other grounding arrangements in the prior art.

Also in the past switch and terminal assemblies mounted to dynamoelectric machines for controlling at least the winding circuitry thereof, the terminals of such past electrical switches had electrical or terminal connector sections or ends externally of the switch casing. These terminal connector sections were adapted to receive a sleeve or slip-on type quick disconnect or fitting which were provided on the ends of leads for connection in circuit with the electrical switch. In some of the past electrical switches, these terminals were aligned generally in row or tier formation at the opposite ends of the switch, and the terminals were provided with either a single connector section or dual, side-by-side connector sections which were also disposed in aligned row or tier formation, as previously mentioned. At least one of the disadvantageous or undesirable features of such past switch and terminal assemblies is believed to be that in some applications as many as eight to twelve individual leads were connected with the various switch terminals which was, of course, time consuming on a production line basis as well as confusing in the event of repair or replacement in the aftermarket. Another disadvantageous or undesirable feature of the aforementioned past switch and terminal assemblies is believed to be that the terminal connector sections were so closely spaced with respect to each other difficulty was encountered when the quick disconnects of the leads were assembled to the terminal connector sections.

In still another of the past switch and terminal assemblies, a casing was provided as an integral part of an electrical circuit, and a metallic connector or strip had one end electrically connected with a wall of the casing exteriorly thereof. The metallic strip was bent over an adjacent wall of the casing, and the opposite end of the strip was received in electrical connection onto a terminal of the casing which extended through the adjacent wall thereof.

SUMMARY OF THE INVENTION

Among the several objects of the invention may be noted the provision of an improved dynamoelectric machine and an improved method of assembling a switch and terminal assembly which overcome the disadvantageous or undesirable features discussed hereinabove, as well as others, with respect to the prior art; the provision of such dynamoelectric machine and such method wherein a grounding device of such switch and terminal assembly is adapted for coupling in ground circuit relation with means for securing such switch and terminal assembly to the dynamoelectric machine; the provision of such dynamoelectric machine and such method wherein a ground terminal is for the most part mounted externally of such switch and terminal assembly; the provision of such dynamoelectric machine and such method in which the ground terminal is utilized to retain a pair of separable casing members of the switch and terminal assembly against separation; the provision of such dynamoelectric machine and such method in which a ground connection section of the ground terminal is disposed in spaced relation and in row formation with at least some of a plurality of electrical connection sections of other terminals generally along a wall means of the switch and terminal assembly; the provision of such dynamoelectric machine and such method in which the terminals of such switch are positively and predeterminately located in the casing members of the switch and terminal assembly; and the provision of such dynamoelectric machine and such method in which the components of the switch and terminal assembly are simplistic in design, economical to manufacture, and easily assembled. These as well as other objects and advantageous features of the present invention will be in part.

Further in general and in one form of the invention, a method is provided for assembling a switch and terminal assembly comprising the steps of: disposing a plurality of terminals in one of a pair of casing members with electrical connection sections exposed beyond said one casing member and aligned generally in row formation therealong; positioning the other of the casing members with respect to the one casing member and the terminal plurality so as to retain the terminal plurality against displacement from the one and other casing members; and disposing a ground connection section of a ground terminal in spaced relation and in the row formation with the electrical connection section and inserting a mounting portion of the ground terminal through one of the one and other casing members into gripping engagement with the other of the one and other casing members so as to retain them against separation and the ground terminal against displacement with respect to the casing members.

BRIEF DESCRIPTION OF THE DRAWINGS

FIG. 2 is an enlarged plan view of the switch and terminal assembly of FIG. 1;

FIG. 3 is a side elevational view of the switch and terminal assembly of FIG. 2 with one of the casing members thereof removed to show the internal components of the switch and terminal assembly;

FIG. 5 is a plan view of a ground terminal for the switch and terminal assembly of FIG. 1 prior to its assembly in the switch and terminal assembly;

FIG. 6 is an enlarged fragmentary view taken from FIG. 3 showing a terminal mounted in the switch and terminal assembly in one form of the invention and illustrating principles which may be practiced in a method of assembling the switch and terminal assembly;

FIG. 7 is a sectional view taken generally along line 7—7 of FIG. 6;

FIG. 8 is a partial sectional view of an alternative switch and terminal assembly and also illustrating at least in part principles which may be practiced in a method of assembling such switch and assembly in one form of the invention;

FIG. 9 is a partial sectional view of yet another alternative switch and terminal assembly and also illustrating at least in part principles which may be practiced in a method of assembling such switch and terminal assembly in one form of the invention;

FIG. 10 is a plan view of the ground terminal utilized in the switch and terminal assembly of FIG. 11.

Corresponding reference characters indicate corresponding parts throughout the several views of the drawings.

The exemplifications set out herein illustrate preferred embodiments of the invention, and such exemplifications are not to be construed as limiting, in any manner, the scope of the invention.

DETAILED DESCRIPTION OF THE PREFERRED EMBODIMENTS

Figure 4:
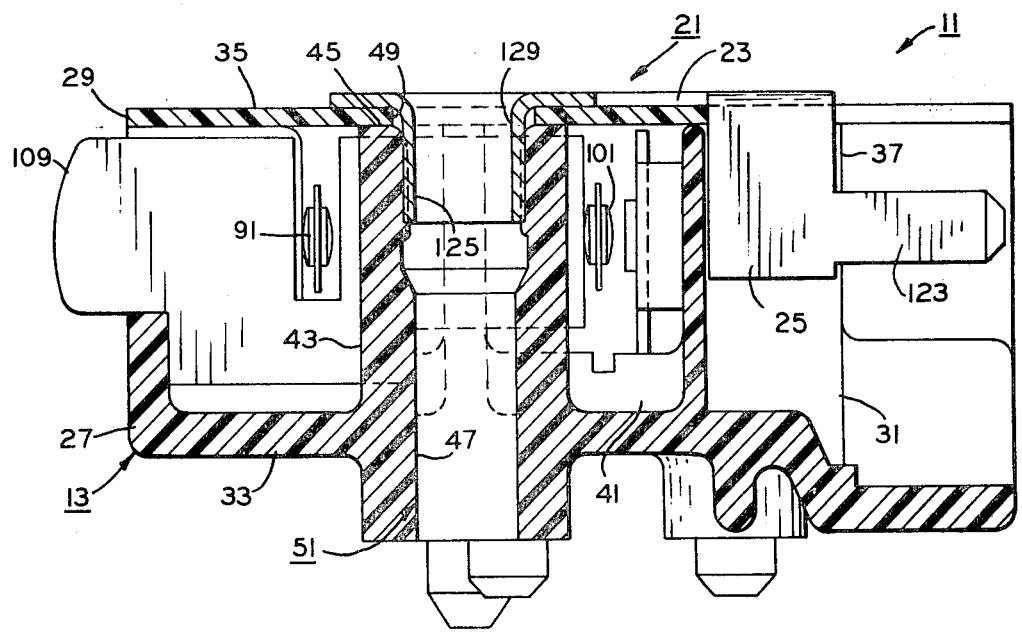
FIG. 4 is a sectional view taken generally along line 4—4 of FIG. 3.

Referring to the drawings in general, there is shown at 11 a switch and terminal assembly (FIGS. 1-10). Switch and terminal assembly 11 is provided with a casing 13 having a plurality of wall means, indicated generally at 15, and a plurality of terminals 17 is disposed in one of the wall means of the wall means plurality and respectively have electrical connection sections 19 exposed beyond the casing generally in a predetermined row or aligned formation along the one wall means (FIGS. 2 and 3). A generally rigid grounding device 21 includes a mounting section or arm portion 23 disposed on another of the wall means of the wall means plurality 15 exteriorly of casing 13 for mounting engagement therewith (FIGS. 2 and 4). A ground terminal or arm portion 25 of grounding device 21 is integral with arm portion 23 thereof and extends over the one wall means in predetermined spaced relation with electrical connection sections 19 and in the row formation therewith. (FIGS. 2-4).

More particularly and with specific reference to FIGS. 2-4, casing 13 generally comprises a pair of casing members 27, 29 respectively formed from any suitable dielectric material and which are adapted to be secured together. Although not shown, it is contemplated that casing members 27, 29 could be mating sections or half-sections of casing 13 within the scope of the invention so as to meet the objects thereof. With respect to wall means plurality 15 of casing 13, casing member 27 includes at a top wall 31 and an integral adjacent wall or sidewall 33 intersecting therewith, and casing member 29 comprises another adjacent wall or sidewall 35 opposite sidewall 33 and also intersecting with the top wall. Top wall 31 has an exterior or generally exposed surface 37 intersected by an adjacent surface 39, and casing member 29 is disposed generally in overlaying relation on adjacent surface 39. When casing members 27, 29 are secured together or joined in assembled relation, as discussed hereinafter, a switch means accommodating chamber 41 is defined within wall means plurality 15 of casing 13. Means, such as a hub 43, is integrally provided on casing member sidewall 33 for extending through chamber 41 toward casing member 29, and a free end 45 of the hub is juxtaposed with sidewall 35 of casing member 29. Aligned apertures or bores 47, 49 are respectively provided through hub 43 and casing member sidewall 35 generally comprising an opening 51 through casing 13 between opposite casing member sidewalls 33, 35. It is contemplated that a mating hub could be provided on casing member sidewall 33 in alignment with hub 43 to accommodate opening 51 within the scope of the invention so as to meet the objects thereof.

Casing member 27 has a plurality of terminal receiving or retaining means, such as openings or slots 53, disposed or extending in spaced relation and generally in aligned or row formation along top wall 31. Slot plurality 53 includes individual slots 53a-53h and ground terminal receiving opening 53k. As best seen in FIGS. 6 and 7, slots 53 are each provided with a pair of opposed, generally parallel and spaced apart sidewalls or surfaces 55, 57 respectively intersecting with both exposed and adjacent surfaces 37, 39 of top wall 31, and means such as a seat, end wall or abutment 59, for seating terminals 17 is disposed in the top wall between surfaces 37, 39 so as to intersect with exposed surface 37. Means, such as a guide or abutment ridge 61, for positioning or abutting engagement with terminals 17 is integrally formed on surface 55 of slots 53, and means, such as a recess 63, for capturing terminal 17 or for abutting engagement therewith is provided in top wall 31 intersecting with both surface 57 of slots 53 and adjacent surface 39 of the top wall. Of course, as previously mentioned, when casing member 29 overlays adjacent surface 39 of top wall 31 so as to close terminal capturing means or recesses 63 with portions of casing member 29 forming end walls 65 of openings 53 generally opposite end walls 59 between sidewalls 55, 57 thereof.

Terminal plurality 17 includes individual electrical terminals 17a–17h which are provided for retaining or displacement preventing engagement with openings 53a–53h in top wall 31, and the terminals are each provided with generally side-by-side quick disconnects or tabs 67, 69 which may be of different configurations, as shown, if desired. While eight terminals are disclosed as generally comprising terminal plurality 17, it is contemplated that a greater or lesser number of such terminals may be employed according to the connection requirements for any given switch and terminal assembly, such as terminal 11, within the scope of the invention so as to meet the objects thereof. Tabs 67, 69 which comprise electrical connection section 19 of terminals 17 are exposed beyond casing 13 so as to extend respectively along top wall 31 thereof generally in aligned or row formations. Terminals 17 are also each provided with means, such as a supporting or mounting section 71, for mounting the terminals in the retaining or displacement preventing engagement within slots 53, and the mounting section is integral with electrical connection 19 of each terminal 17. Mounting section 71 is generally rectangular in cross-section having a pair of opposite faces 73, 75 which are received in abutting engagement between opposed surfaces 55, 57 of slot 53, and a pair of opposite end edges 77, 79 are interconnected between the opposite faces for abutting or seating engagement with opposed end walls 59, 65 on top wall 31 and casing member 29, respectively. Extension means 81 is integrally formed on mounting section 71 protruding or extending from face 75 thereof, and a pair of abutments 83, 85 are provided on the extension means so as to be captured or disposed in abutting engagements with confronting surfaces in recess 63 of top wall 31.

Referring again to the drawings in general and summarizing at least in part with respect to the foregoing, a switch and terminal assembly 11 has casing 13 including at least one wall means, such as top wall 31 of wall means plurality 15, and terminal means, such as terminal 17, is provided with electrical connection section 19 and mounting section 71. Mounting section 71 (FIGS. 2–4) includes opposite faces 73, 75 interconnected between opposite end edges 77, 79, and abutments 83, 85 protrude from one of the opposite faces between the end edges (FIGS. 6 and 7). Means, such as slots 53, is provided for positioning mounting section 71 with respect to top wall 31 with electrical connection section 19 of terminal 17 exposed therebeyond, and the positioning means or slot is generally comprised at least one slot surface 57 for abutting engagement with one opposite face 75 and disposed between opposed end walls 59, 65 for containing engagement with opposite end edges 77, 79. Slot 53 also includes means, such as recess 63, intersecting with slot surface 57 between slot end walls 59, 65 for capturing abutments 83, 85 in abutting engagement therein and means, such as ridge 61, on wall means 15 for engagement with opposite face 73 to retain opposite face 75 and the abutments generally against displacement from their abutting engagement with slot surface 57 and recess 63, respectively.

In a method of assembling switch and terminal assembly 11 in one form of the invention and as illustrated generally in FIGS. 6 and 7, terminal 17 is moved generally laterally into or across top wall 31 toward seat or end wall 59 so as to expose electrical connection section 19 beyond the top wall, and generally simultaneously therewith, both mounting section 71 and its extension means 81 are passed through slot surfaces or sidewalls 55, 57 and recess means 63 into positioning engagement therewith. When mounting section 71 becomes engaged with seat 59, casing member 29 is attached to casing member 27 so as to extend at least across sidewalls 55, 57 and recess means 63 and retain mounting section 71 and its extension means 81 against displacement therefrom.

Referring again with particularly to FIGS. 2 and 3, some of slots 53, such as slots 53a, 53b, 53d, 53g and 53h, communicate or connect with switch accommodating chamber 41 within casing 13. Further, some of terminals 17, such as terminals 17a, 17b, 17d, 17g and 17h, generally comprise switch terminals each passing through its respective opening into chamber 41 and each supporting switch means within the chamber. For instance each of terminals 17a, 17b, 17d, 17g and 17h are provided with extensions or switch means supporting sections 87a, 87b, 87d, 87g and 87h integral with respective mounting sections 61 thereof and disposed within chamber 41. An electrical contact 89 is carried on supporting section 87a of terminal 17a for making and breaking engagement with a movable contact 91 carried on a resilient switch blade 93 which is attached by suitable means (not shown) to supporting section 87h of terminal 17h. In the at-rest or break position of movable contact 91, the resiliency of switch blade 93 urges the movable contact into engagement with an abutment or stop 95 provided therefor on casing member 27 within chamber 41. A pair of electrical contacts 97, 99 are carried on supporting sections 87b, 87d of terminals 17b, 17d for making and breaking engagement with another movable contact 101, respectively, which is, in turn, carried on another resilient switch blade 103 attached by suitable means (not shown) to supporting section 87g of terminal 17g. The end portions of supporting sections 87a, 87b and 87d for terminals 17a, 17b and 17d may be supported on confronting abutments provided for stability purposes on casing member 29 within chamber 41, as shown, if desired, and the end portions or supporting sections 87g, 87h for terminals 17g, 17h are bent at a preselected angle so as to stress switch blades 93, 103 urging movable contacts 91, 101 toward their at-rest positions engaged with stop 95 and making with associated contact 97, respectively which associated contact may be stationary. It may be noted that switch blades 93, 103 and their respective bent end portions of supporting sections 87g, 87h for terminals 17g, 17h are positively retained or positioned within means, such as slots or grooves 105, 107 or the like, for supporting them against displacement in response to stressing of the switch blades. While switch blades 93, 103 are of the slow-acting type, as shown, it is contemplated that, if desired, either or both of the switch blades may be of the snap-acting type well known to the art within the scope of the invention. A generally flat, elongate actuator, such as a push button 109 or the like for instance, is reciprocally mounted in a pair of guides 111, 113 provided therefor in casing member 27, and an upper end or face 115 of the push button is juxtaposed with switch blade 103 for operating engagement therewith to effect the making and breaking of movable contact 101 with opposed electrical contacts 97, 99, which may be stationary upon reciprocal movement of the push button, as discussed hereinafter. Switch blade 93 passes through a slot 117 provided in push button 109, and the upper end portion of the push button slot is engageable with the switch blade to prevent displacement of the push button from casing 13 while the lower end portion of the push button slot is operatively engageable with the switch blade to effect the making and breaking of movable contact 91 with stationary contact 89 upon the operating reciprocal movement of the push button. Of course, the aforementioned overlaying or mating relationship of casing member 29 with respect to casing member 27 also serves to retain push button 109 against displacement from its guides 111, 113.

Figure 1:
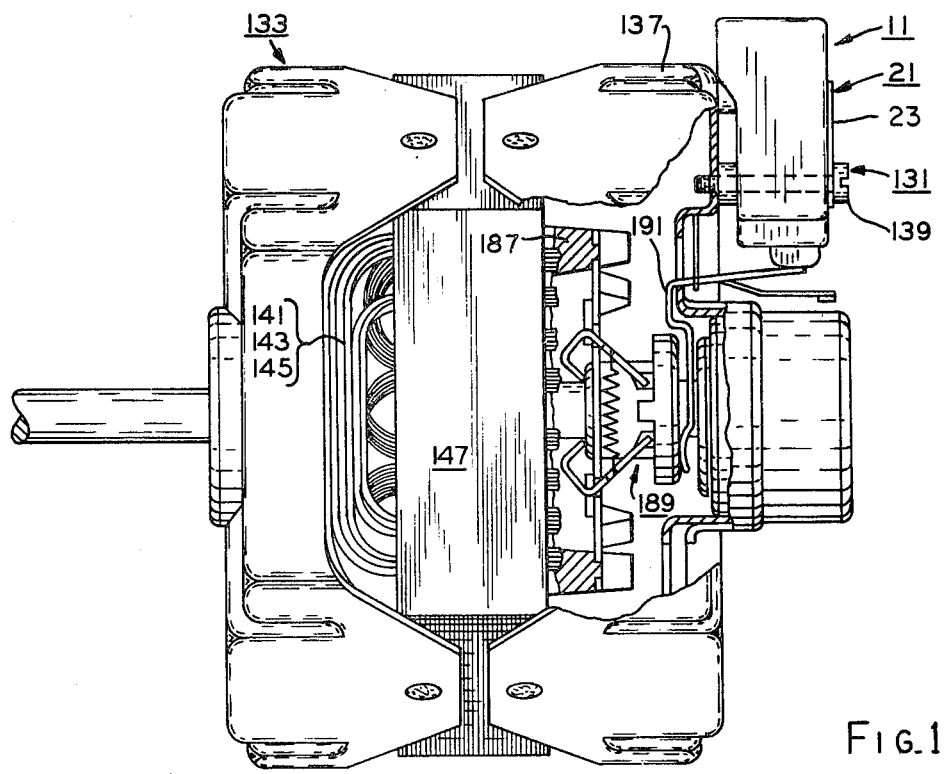
FIG. 1 is a side elevational view of a dynamoelectric machine in one form of the invention having a switch and terminal assembly.

Referring to FIGS. 2, 4 and 5, grounding device 21 is formed from a generally rigid electrical conductive metal having a pair of arms or arm portions, such as a ground terminal or terminal flange 25 and a mounting section 23, respectively, and the ground terminal is bent generally from the plane of the mounting section so as to define a supporting section received between opposed surfaces 55, 57 of ground slot 53k in top wall 31 of casing member 27. A tab 123 is integrally formed in ground terminal 25 so as to comprise a ground connection section thereof, and tab 123 extends beyond exposed surface 37 of top wall 31 generally in aligned or row formation with tabs 67 of terminal plurality 17. Mounting section 23 is disposed or mounted to sidewall 35 of casing member 27 and has means, such as a tubular portion or sleeve 125, integrally formed therewith for retaining casing member 27, 29 against displacement when the retaining means or sleeve is pressed or otherwise fitted into gripping or displacement preventing engagement with casing member hub 43 within opening 47 therethrough, as discussed hereinafter. Means, such as a generally annular resilient or raised portion 127, is provided in mounting section 23 generally at the juncture of sleeve 125 therewith for deformation to accommodate thermal expansion and contraction of casing members 27, 29 when they are secured or otherwise connected together by grounding device 21. Mounting section 23 and sleeve 125 are provided with means, such as a bore or opening 129 therethrough, for receiving or accommodating an electrical conductive mounting member, such as a screw or stud 131 or the like, utilized to mount switch and terminal assembly 11 to a prime mover, such as a dynamoelectric machine 133, as shown in FIG. 1 and discussed hereinafter.

Summarizing at least in part with respect to the foregoing, there is illustrated in one form of the invention a method of assembling switch and terminal assembly 11. In this method, terminal plurality 17 is disposed in casing member 29 with electrical connection section 19 of each terminal of the terminal plurality extending exteriorly of the casing member, and mounting section 23 of the grounding device is inserted through casing member 29 into gripping engagement with casing member 27 so as to retain them against displacement or separation and the grounding device against displacement with respect to casing 13.

More particularly, with the terminals of terminal plurality 17 mounted in slots 53 of casing member 27 and the other components of switch and terminal assembly 11 disposed within chamber 41 thereof as described hereinabove and shown in FIG. 3, casing member 29 is positioned or assembled in its mating relation with casing member 27 so as to close chamber 41. Of course, such assembly of casing member 29 to casing member 27 also closes slots 53 so as to prevent displacement of the terminal 17 generally laterally thereof since casing member 29 overlays adjacent surface 39 of top wall 31 of casing member 27, as previously mentioned. With casing members 27, 29 so assembled in their mating relation, ground terminal 25 of grounding device 21 is inserted through a slot or aperture 135 in casing member 29 into guided or abutting relation between opposed surfaces 55, 57 of ground slot 53k, and ground connection section 123 of the ground terminal is, of course, exposed beyond top wall 31 of casing member 27 in spaced relation with one of tabs 67, 69 on electrical connection sections 19 of terminals 17 and aligned generally in the row formation therewith. Generally simultaneously with the insertion of ground terminal 25 into ground slot 53k, sleeve 125 of grounding device 21 is inserted through aperture 49 of casing member 29 into press-fitted or other gripping engagement with hub 43 of casing member 27 generally within opening 47 therein. In this manner, mounting section 23 of grounding device 21 is engaged or overlaid with sidewall 35 of casing member 29 in displacement preventing engagement therewith to obviate the separation of casing member 29 from its mating relation with casing member 27 when the gripping engagement is effected between sleeve 125 and hub 43. During the above described assembly of grounding device 21 to casing members 27, 29 to prevent displacement or separation thereof, it may be noted that deformation means or resilient portion 127 of mounting section 23 on the grounding device is deformed so as to be pressed generally flat, i.e. into the plane of the mounting section, and such deformation of the resilient portion 127 serves to accommodate expansion and contraction of the casing members in response to temperature variations to which switch and terminal assembly 11 may be subjected.

With the component parts of assembly 11 so assembled, as described above, it may then be mounted to dynamoelectric machine 133. To effect such mounting, assembly 11 may be disposed in its desired position on a dynamoelectric machine component, such as an end frame 137, as shown in FIG. 1, and the threaded shank of mounting screw 131 is inserted through openings 51, 129 of casing 13 and grounding device 21, respectively, into threaded engagement with the end frame. Of course, in the alternative, mounting screw 131 may be inserted through openings 51, 129 prior to the disposition of assembly 11 on dynamoelectric machine end frame 137. Upon the establishment of the threaded engagement between mounting screw 131 and dynamoelectric machine end frame 137, a head 139 of the mounting screw is advanced into mechanical engagement or abutment with mounting section 121 of grounding device 21 generally about opening 129 therethrough. In this manner, the threaded engagement of mounting screw 131 with dynamoelectric machine end frame 137 is effective to mount assembly 11 to dynamoelectric machine 133, and the mechanical engagement of mounting screw head 139 with grounding device 21 also automatically completes a ground circuit from the dynamoelectric machine end frame through the mounting screw and the grounding device to ground connection section 123 thereof which is adapted for connection electrically to ground.

Figure 11:
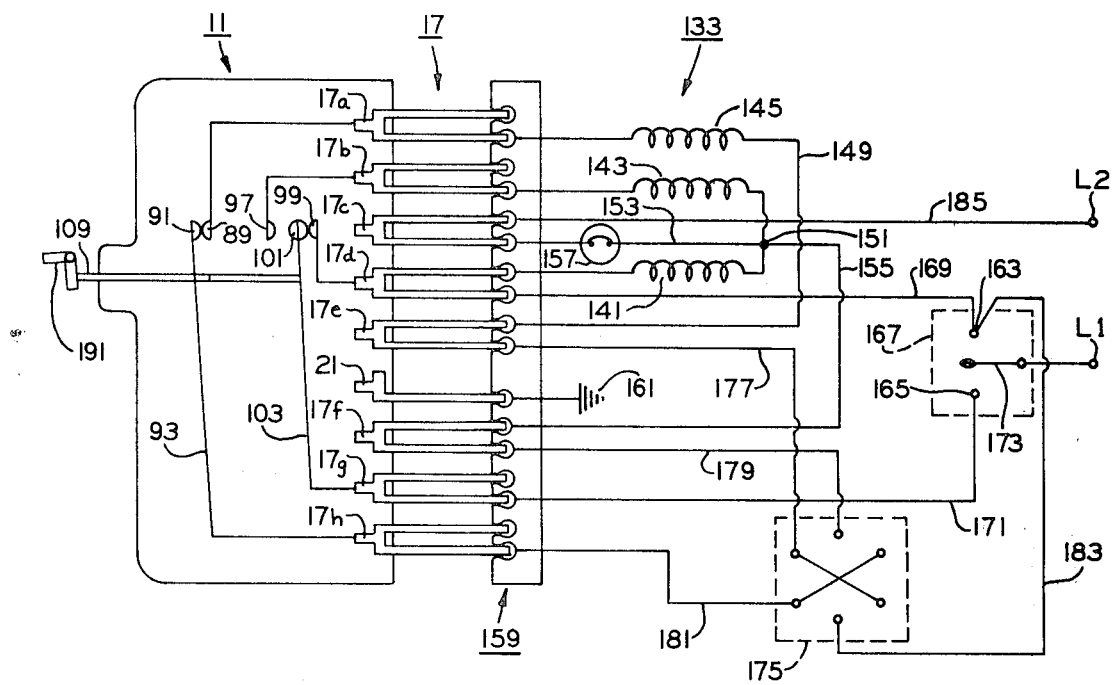
FIG. 11 is an exemplary schematic wiring diagram of the dynamoelectric machine and the switch and terminal assembly illustrating schematically a multiple connector assembly carrying a plurality of leads and adapted to be received by the terminals of the switch and terminal assembly.

FIG. 11 shows switch and terminal assembly 11 utilized as a switch and electrical circuit making unit in circuit controlling relation with the windings of dynamoelectric machine 133 which is shown for example as a single phase multi-speed induction motor. In this illustrated exemplification, dynamoelectric machine 133 has two run or main field windings 141, 143 (e.g., four pole and six pole windings) selectively energized to provide two different speeds of operation and a start or auxiliary winding 145 connectable in parallel with run winding 143 during starting conditions. These windings may be arranged on a stationary assembly 147 of dynamoelectric machine 133 (as best seen in FIG. 1) and interconnected in any suitable manner well known to the art. Run windings 141, 143 and start winding 145 are respectively connected with terminals 17d, 17b and 17a and the start winding is also connected in series circuit relation with dummy terminal 17e by a lead 149. A connection point 151 is provided between run windings 141, 143, and a pair of leads 153, 155 are respectively connected between connection point 151 and dummy terminals 17c, 17f. A standard thermal protector device 157 may be interposed in lead 153 if desired. The above-discussed connections of the windings to the various terminals may be made by the use of quick disconnects, if desired, as is well known to the art.

A multiple connection assembly 159 is provided with a plurality of female receptacles which are removably and electrically coupled with electrical connector sections 19 of terminals 17 and ground connection section 123 of grounding device 21, and of course, grounding device 21 is connected to a ground at 161 through the multiple connection assembly. Multiple connection assembly 159 connects terminals 17d, 17g with a pair of terminal posts 163, 165 of a single pole double throw speed selector switch 167 through a pair of leads 169, 171. Speed selector switch 167 has a movable arm 173 for circuit making engagement with its cooperating posts 163, 165, and the arm is connected in circuit relation with a line terminal L1. A double pole double throw reversing switch of a type well known to the art is illustrated schematically at 175 for controlling the direction of current through start winding 145 and, consequently, the direction of rotation of motor 133. Multiple connection assembly 159 respectively connects dummy terminals 17e, 17f, 17h to reversing switch 175 through leads 177, 179, 181. Another lead 183 is connected between reversing switch 175 and terminal post 163 of speed selector switch 167. To complete the description of the exemplary circuit of FIG. 11, multiple connector assembly 159 also connects dummy terminal 17c to a line terminal L2 through another lead 185.

Referring now to FIG. 1, dynamoelectric machine 133 is provided with a rotatable assembly 187 which is rotatably mounted within stationary assembly 147 and driven in response to the energization of windings 141, 143, 145 of the dynamoelectric machine, as is well known in the art. A centrifugal switch device 189 also of a type well known to the art is conjointly rotatable with rotatable assembly 187 and axially movable relative thereto between a start or stand still position and an axially advanced or run position. A lever 191 is pivotally mounted to end frame 137 having one end driven by centrifugal switch device 189 and the other end disposed in driving or operating engagement with the exterior end of push button 109 of assembly 11. When dynamoelectric machine 133 is de-energized, centrifugal switch device 189 is in its stand still position pivoting lever 191 so as to exert a force on push button 109 of assembly 11 urging switch blades 93, 103 upwardly to engage movable contacts 91, 101 thereof with stationary contacts 89, 99. Of course, while the combination of centrifugal switch device 189 and lever 191 are disclosed as means for actuating assembly 11, it is contemplated that the assembly may be actuated by other means or by the centrifugal switch device itself within the scope of the invention so as to be commensurate with the objects thereof.

In order to effect operation of dynamoelectric machine 133 at its high speed and referring to FIGS. 1, 3 and 11, arm 173 of speed selector switch 167 is engaged with its cooperating post 163 thereby to connect four pole run winding 141 across terminals L1, l2 through lead 169, terminal 17d, lead 153, terminal 17c and lead 185. At the same time, start winding 145 is also energized through reversing switch 173 which may be connected across line terminals L1, L2 to effect current flow through lead 149, start winding 145, terminal 17a, switch blade 93, terminal 17h, and lead 181. In this manner, both run and start windings 141, 145 are energized to effect the starting operation of dynamoelectric machine 133, and as it comes up to speed, centrifugal switch mechanism 189 is actuated from its start position to its run position, as is well known in the art, allowing lever 191 to pivot so as to alleviate the force exerted thereby on push button 190 of assembly 11. When such force is removed from push button 109, the resilient forces of switch blades 93, 103 move the push button downwardly so as to make movable contact 99 on switch blade 103 with stationary contact 97 and to break movable contact 91 on switch blade 93 from stationary contact 89. Of course, the breaking of contacts 89, 91 interrupts the circuit across reversing switch 173 to start winding 145 thereby to take it off the line.

In order to effect the operation of dynamoelectric machine 133 at its low speed, arm 173 of speed selector switch 167 is engaged with its cooperating terminal post 165 thereby to connect run winding 141 across line terminals L1, L2 through lead 171, terminal 17g, switch blade 103, terminal 17d, the run winding, lead 153, terminal 17q and lead 185. At the same time start winding 145 is also energized through reversing switch 173 which may be connected across line terminals L1, L2 through the same circuitry as previously discussed hereinabove. In this manner, both run and start windings 141, 145 are energized to effect the starting operation of dynamoelectric machine 133, and as it comes up to speed, centrifugal switch device 189, lever 191 and push button 109 are operated in the same manner as previously described hereinabove. Again, the resilient force of switch blade 103 acts to break movable contact 101 from stationary contact 99 thereby to take run winding 141 off the line and to make movable contact 101 with fixed contact 97 thereby to place six pole run winding 143 across the line so that dynamoelectric machine will run at its slow speed. The resilient force of switch blade 93 acts to break movable contact 91 from stationary contact 89 thereby to interrupt the circuit across reversing switch 173 to start winding 145 so that it also is taken off the line. Further, the breaking of movable contact 101 from stationary contact 99 acts to take the reversing switch off the line so long as run winding 143 remains energized to operate dynamoelectric machine 137 at its slower speed.

While assembly 11 is disclosed in conjunction with a single phase, multi-speed induction motor, it is to be understood that such assembly may also be employed with other types of motors, and it is also contemplated that such assembly may be utilized with or without multiple connection assembly 159 within the scope of the invention. Further, in some applications of assembly 11, the switch means portion thereof including switch blade 93 may be employed to control auxiliary circuits other than the winding circuitry of dynamoelectric machine 133, as is well known in the art without departing from the scope of the invention.

In FIG. 8, an alternative construction for switch and terminal assembly 11 is shown which meets the objects set out hereinbefore, and such alternative construction may also have additional objects and advantageous features which will be pointed out or become apparent hereinafter. In the alternative construction, hub 43 of casing member 27 is provided with a pair of stepped bores 201, 203 or openings therethrough, and an annular shoulder 205 is provided on the hub between the stepped bores. Smaller stepped bore 203 is sized to slidably receive sleeve 125 of grounding device 21 when it is assembled to casing members 27, 29 in their mating positions, as previously described. With sleeve 125 so inserted into smaller stepped bore 203, a tool (not shown) may be inserted through larger stepped bore 201 into flaring engagement with the free end of the sleeve so as to deform or flare it into abutting or gripping engagement with shoulder 205. In this manner, the gripping engagement of sleeve 125 with hub shoulder 205 retains casing members 27, 29 against displacement or separation and retains grounding device 21 in its predetermined assembled position on casing 13. Of course, as sleeve 125 is received in smaller stepped bore 203 of hub 43, terminal 25 of grounding device 21 is inserted through slot 135 of casing member 29 into its mounted position within slot 53k in top wall 31 of casing member 27 with ground connection section 123 exposed beyond the top wall in the row formation with electrical connection section 19 of terminals 17, as previously discussed. Further, when grounding device 21 is so mounted to casing 13 by the flaring of sleeve 125 into gripping engagement with shoulder 205, annular resilient portions 127 of the grounding device is also deformed to accommodate thermal expansion and contraction of casing 13, as previously discussed.

Referring now to FIGS. 9 and 10, another alternative construction for switch and terminal assembly 11 is shown which meets the objects set out hereinbefore, and such alternative construction may also have additional objects and advantageous features which will become apparent or be pointed out hereinafter. In FIG. 10, an alternative grounding device 211 is shown having generally the same component parts and functioning generally in the same manner as the previously described grounding device 21 with the exception that sleeve 125 thereof is omitted from grounding device 211. Hub 43 of casing member 27 also has a bore or opening 213 extending therethrough.

When casing members 27, 29 are assembled together in their mating positions, as previously described, grounding device 211 is disposed with its mounting section 23 engaged with sidewall 35 of casing member 29 so that opening 129 in the mounting section is generally aligned with bore 213 of hub 43 and aperture 49 of casing member 29. A sleeve or eyelet 215, which has opposite end portions 217, 219 and a bore 221 extending therethrough, is inserted through the aligned openings 49, 129 and 213, and the opposite end portions of the sleeve may then be deformed or flared outwardly into gripping engagement with the grounding device mounting section 23 about opening 129 therein and sidewall 33 of casing member 27 about hub opening 213 therethrough. Of course, alternatively one of the opposite ends 217, 219 of sleeve 215 may be preflared, and upon insertion of the sleeve into openings 49, 129 and 213, the preflared one of opposite ends 217, 219 is engaged with one of grounding device mounting section 23 and casing member sidewall 33. Thereafter, the other of opposite ends 217, 219 is deformed or flared outwardly into gripping engagement with the other of grounding device mounting section 23 and casing member sidewall 33. In these manners, the gripping engagement of the flared end portions 217, 219 of sleeve 215 with mounting section 23 of grounding device 211 and sidewall 33 of casing member 27 retains casing members 27, 29 against displacement or separation and retains grounding device 211 against displacement or separation from casing 13. Of course, when mounting section 23 of grounding device 211 is positioned in engagement against sidewall 35 of casing member 29, terminal 25 of the grounding device is inserted through slot 135 of the casing member into its mounted position within slot 53k in top wall 31 of casing member 27 with ground connection section 123 exposed beyond the top wall in the row formation with electrical connection sections 19 of terminals 17, as previously discussed. Further, during the mounting of grounding device 211, annular resilient portion 127 thereof is deformed to accommodate thermal expansion and contraction of casing 13, as previously discussed.

From the foregoing, it is now apparent that a novel prime mover and a method of assembling a switch and terminal assembly have been provided meeting the objects and advantageous features set out hereinbefore, as well as others, and it is contemplated that changes as to the precise arrangements, shapes, details and connections of the components of such novel prime mover and method as well as in the precise steps of such novel method may be made by those having ordinary skill in the art without departing from the spirit of the invention or the scope thereof, as set out in the claims which follow.

What I claim as new and desire to secure by Letters Patent of the United States is:

1. A method of assembling a switch and terminal assembly having a casing including a pair of casing members, a switch means accommodating chamber within the casing, a plurality of terminals respectively having electrical connector sections, and a ground device having a ground connection section and another section, the method comprising the steps of:

disposing the terminals in one of the casing members with the electrical connection sections of the terminals exposed beyond the casing and arranged generally in row formation therealong;

positioning the other of the casing members with respect to the one casing member and the terminals so as to generally enclose the chamber within the casing and retain the terminals against displacement therefrom; and thereafter disposing the ground connection section of the grounding device generally in the row formation with the electrical connection sections of the terminals and inserting the another section of the grounding device from exteriorly of the enclosed casing through one of the one and other casing members into releasable gripping engagement with the other of the one and other casing members so as to at least in part oppose the separation thereof and the displacement of the grounding device from the casing.

2. A method of assembling a switch and terminal assembly having a casing with a plurality of wall means, the method comprising the steps of:

providing a plurality of terminals along one of the wall means of the casing with the casing being enclosed and with respective electrical connector sections of the terminals exposed beyond the one wall means generally in row formation; and thereafter associating a ground device with another wall means exteriorly of the casing and generally simultaneously disposing a ground connection section of the ground device generally in the row formation with at least a part of the electrical connector sections of at least some of the terminals beyond the one wall means, respectively.

3. The method as set forth in claim 2 wherein the associating and disposing step includes releasably mounting a part of the ground device to the casing.

4. A method of assembling a switch and terminal assembly having a casing including a pair of casing members with a pair of means therein for defining an opening through the casing and with a switch means accommodating chamber within the casing members adapted to be generally isolated from the opening, and a plurality of terminals each having an electrical connection section, the method comprising:

disposing the terminals in one of the casing members with the electrical connection sections extending generally in row formation exteriorly of the one casing member;

fitting the casing members together so as to capture the terminals and enclose the switch means accommodating chamber therein and aligning the defining means so as to establish the opening through the casing; and thereafter arranging a grounding device on the casing at least in part exteriorly thereof with a ground connection section of the ground device being conjointly arranged therewith in the casing so as to extend at least in part exteriorly of the casing in the row formation with the electrical connection sections of at least some of the terminals and disposing about the opening a means associated with the grounding device and at least one of the casing members for retaining the casing members against separation and the grounding device against displacement from the casing.

5. The method as set forth in claim 4 wherein the retaining means is integral with the grounding device and wherein the arranging and disposing step comprises gripping the retaining means in engagement with the at least one casing member generally about the opening.

6. The method as set forth in claim 4 wherein the arranging and disposing step comprises inserting the retaining means at least in part into the opening and connecting a pair of opposite end portions on the retaining means in displacement preventing engagement with the grounding device and the at least one casing member.

7. The method as set forth in claim 4 wherein the casing members have a plurality of wall means defining the chamber with the opening extending between a pair of opposite wall means of the plurality thereof and wherein the arranging and disposing step comprises overlaying the grounding device at least in part on one of the opposite wall means.

8. A method of assembling a switch and terminal assembly having a casing with a plurality of wall means, the method comprising the steps of:

supporting a plurality of terminals in one of the wall means of the casing with the casing being enclosed and exposing respective electrical connector sections on the terminals beyond the one wall means generally in row formation exteriorly of the enclosed casing; and thereafter passing a ground device from exteriorly of the enclosed casing so as to associate a part of the ground device with the one wall means and exposing a ground connection section on the part of the ground device beyond the one wall means generally in the row formation with at least a part of the respective electrical connector sections of at least some of the terminals.

9. The method as set forth in claim 8 wherein the passing and exposing step includes arranging another part of the ground device generally in overlaying relation with another of the wall means of the casing exteriorly thereof.

10. A method of assembling a switch and terminal assembly having a ground device with a ground connection section, a plurality of terminals each having an electrical connector section, a pair of casing members, one of the casing members having at least one wall means with a plurality of means arranged generally in row formation therealong and adapted for receiving a part of at least some of the terminals and a part of the ground device, respectively, and the other of the casing members having at least another wall means with means therein adapted for accommodating passage of the ground device part, the method comprising the steps of:

positioning the parts of the at least some terminals in some of the receiving means therefor in the at least one wall means of the one casing member and exposing the electrical connector sections of the terminals beyond the at least one wall means generally in row formation, respectively;

overlaying at least the some receiving means in the one wall means with a part of the at least another wall means thereby to capture the terminal parts in the some receiving means and aligning the passage accommodating means in the at least another wall means at least in part with another one of the receiving means in the at least one wall means; and thereafter passing the ground device part through the passage accommodating means in the at least another wall means at least in part into another one receiving means in the at least one wall means and thereby exposing the ground connection section of the ground device beyond the at least one wall means generally in the row formation with at least a part of the electrical connector sections of the at least some terminals.

11. The method as set forth in claim 10 wherein the electrical connector sections of the at least some terminals respectively have a pair of tabs generally in side-by-side relation and wherein the positioning and exposing step includes arranging one of the tabs and the other of the tabs generally in the row formation along the at least one wall means with one of the one and other tabs comprising the at least part of the at least some terminals, respectively.

12. The method as set forth in claim 11 wherein the passing and exposing step includes aligning the ground connection section of the ground device generally in the row formation with the one of the one and other tabs, respectively.

13. The method as set forth in claim 12 wherein the one tab and the other tab of the terminals have dissimilar shapes, and the ground connection section of the ground device having a shape generally similar to that of the one of the one and other tabs.

14. The method as set forth in claim 10 wherein the positioning and exposing step includes releasably engaging the parts of the at least some terminals with the some receiving means, respectively.

15. The method as set forth in claim 10 wherein the passing and exposing step includes releasably engaging the ground device part with the another one receiving means.

16. The method as set forth in claim 10 wherein the passing and exposing step includes associating another part of the ground device generally in overlaying relation with the at least another wall means.

17. The method as set forth in claim 10 wherein the passing and exposing step includes releasably engaging the ground device part with the another one receiving means and associating another part of the ground device generally in overlaying relation with the at least another wall means, the releasable engagement between the ground device part and the another one receiving means and the overlaying relation of the ground device another part with the at least another wall means acting at least in part to oppose displacement of the at least another wall means from its overlaying relation with the at least one wall means.

18. The method as set forth in claim 1 wherein the overlaying and aligning step includes releasably securing the casing members with each other.

19. A method of assembling a switch and terminal assembly having a ground device with a ground connection section, a casing including a pair of casing members having a plurality of wall means defining a switch means accommodating chamber within the casing, one of the wall means on one of the casing members having a plurality of slot means therein, at least two of the slot means intersecting with the chamber and at least another one of the slot means being isolated from the chamber, and another of the wall means on the other of the casing member having a passage therein, and a plurality of terminals with at least some of the terminals having an electrical connector section including a pair of tabs having dissimilar configurations with the configuration of one of the tabs being generally similar to that of the ground connection section of the ground device and with at least two of the terminals each having switch means associated therewith, the method comprising the steps of:

positioning the terminals in some of the slot means in the one wall means on the one casing member with the at least two terminals in the at least two slot means of the some slot means and extending the electrical connector sections of the terminals from the some slot means generally beyond the one wall means exteriorly of the chamber with the dissimilar tabs of the at least some terminals respectively arranged in row formation with each other and with the switch means associated with the at least two terminals in the at least two slot means being disposed within the chamber for switching relation with each other;

joining the casing members together to enclose the chamber and overlaying respective parts of the one and another wall means thereby to capture the terminals in the some slot means and at least in part to align the passage in the another wall means on the other casing member with the at least another one slot means in the one wall means on the one casing member; and thereafter entering a part of the ground device from exteriorly of the casing through the passage in the another wall means at least in part into the at least another one slot means in the one wall means and extending the ground connection section from the at least another one slot means beyond the one wall means generally in the row formation with the one tab of the at least some terminals.

20. The method as set forth in claim 19 wherein the positioning and extending step includes releasably engaging a part of each of the terminals with the some slot means, respectively.

21. The method as set forth in claim 19 wherein the entering and extending step includes releasably engaging the grounding device part with the at least another one slot means.

22. The method as set forth in claim 19 wherein the entering and extending step includes arranging another part of the ground device generally in overlaying relation with the another wall means on the other casing member exteriorly of the casing.

23. The method as set forth in claim 2 wherein the casing includes at least one slot means intersecting with the one and another wall means and wherein the associating and disposing step includes passing a part of the ground device from exteriorly of the casing into the at least one slot means and extending the ground connection section of the ground device through the at least one slot means so as to be exposed beyond the one wall means generally in the row formation with the at least part of the electrical connector sections of the at least some terminals, respectively.

24. The method as set forth in claim 23 comprising the additional step of releasably engaging the ground device part with the at least one slot means.

25. A method of assembling a switch and terminal assembly having a casing including a pair of casing members, a plurality of wall means on the casing members adapted for defining a switch means accommodating chamber within the casing, an opening through the casing between a pair of opposite wall means thereof and generally isolated from the chamber, a plurality of terminals each having an electrical connection section, and a ground device having a pair of arm portions with one of the arm portions having a ground connection section thereon, the method comprising the steps of:

positioning the terminals in assembly relation with the another one wall means and exposing therebeyond the electrical connector sections of the terminals generally in row formation;

associating the casing members with each other so as to generally enclose the chamber within the casing, capture the terminals in their row formation in the casing and establish the opening therethrough; and thereafter passing at least a part of one of the arm portions on the ground device from exteriorly of the casing past one of the opposite wall means into assembly relation with another one of the wall means of the casing so that the ground connection section of the ground device is aligned generally in the row formation with at least a part of the electrical connection sections of at least some of the terminals beyond the another one wall means and disposing the other of the arm portions on the ground device exteriorly of the casing generally in overlaying relation with the one opposite wall means and at least generally adjacent the opening through the casing.

26. The method as set forth in claim 25 wherein the passing and disposing step includes releasably engaging the at least part of the one arm portion of the ground device with the another one wall means.

27. The method as set forth in claim 26 wherein the another one wall means has a plurality of slot means therein and wherein the positioning step includes inserting a part of the terminals into the slot means therefor.

28. The method as set forth in claim 27 wherein the associating step includes overlaying a part of the one of the one and other opposite wall means with a part of the another one wall means and capturing the terminal parts in the slot means therefor.

29. The method as set forth in claim 25 wherein the another one wall means has at least one slot means therein at least in part in aligned relation with a passage through the one opposite wall means when the casing members are associated with each other and wherein the passing and disposing step includes inserting the at least part of the one arm portion through the passage and into the at least one slot means thereby to dispose the at least part of the one arm portion in the assembly relation thereof with the another one wall means.

30. The method as set forth in claim 25 wherein the passing and disposing step includes inserting a part of the grounding device integral with the other arm portion thereof into the opening and interconnecting the grounding device part with one of the casing members thereby to at least oppose disassociation of the casing members from each other.

31. The method as set forth in claim 25 comprising the additional step of positioning a means for preventing displacement of the casing members at least in part within the opening and engaging a pair of opposite end portions of the displacement preventing means with the other of the opposite wall means and at least the other arm portion of the ground device in the overlaying relation thereof with the one opposite wall means, respectively.

* * * * *

UNITED STATES PATENT AND TRADEMARK OFFICE
CERTIFICATE OF CORRECTION

PATENT NO. : 4,294,004

DATED : October 13, 1981

INVENTOR(S) : James P. Frank

It is certified that error appears in the above—identified patent and that said Letters Patent hereby corrected as shown below:

```
 3, line  4, after "part" insert --apparent and in part
                  pointed out hereinafter--;
    line 29, after "assembly" insert --mounted thereto--.
 5, line 38, after "connection" insert --section--.
 6, line 61, after "respectively" insert --,--.

8, line 13, after "the" insert --terminals of the--.
10, line 51, delete "17q" and insert --17c--.
15, line 47, delete "1" and insert --10--.
17, line 29, delete "26" and insert --25--.
```

Signed and Sealed this

Thirtieth Day of October 1984

[SEAL]

Attest:

GERALD J. MOSSINGHOFF

Attesting Officer   Commissioner of Patents and Trademarks